(12) United States Patent
Fouet et al.

(10) Patent No.: US 8,350,748 B2
(45) Date of Patent: Jan. 8, 2013

(54) PROCESS AND A DEVICE FOR AUTOMATICALLY DETERMINING METEOROLOGICAL CONDITIONS IN THE VICINITY OF AN AIRCRAFT

(75) Inventors: Guillaume Fouet, Leguevin (FR);
Xavier Grossin, Tournefeuille (FR);
Sébastien Robert, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 28 days.

(21) Appl. No.: 12/828,42

(22) Filed: Jul. 1, 2010

(65) Prior Publication Data
US 2011/0001662 A1    Jan. 6, 2011

(30) Foreign Application Priority Data
Jul. 3, 2009    (FR) .................................... 09 03263

(51) Int. Cl.
*G01S 13/00*    (2006.01)
(52) U.S. Cl. ....................................... 342/26 B; 342/59

(58) Field of Classification Search ................ 342/26 B, 342/59
See application file for complete search history.

(56) References Cited

U.S. PATENT DOCUMENTS

| 5,630,718 | A * | 5/1997 | Montag et al. .................... 434/2 |
| 6,212,132 | B1 * | 4/2001 | Yamane et al. ............... 367/180 |
| 6,441,773 | B1 | 8/2002 | Kelly et al. |
| 6,828,922 | B1 | 12/2004 | Gremmert et al. |
| 6,977,608 | B1 | 12/2005 | Anderson et al. |
| 7,633,428 | B1 * | 12/2009 | McCusker et al. .......... 342/26 B |
| 2004/0044445 | A1 | 3/2004 | Burdon |

FOREIGN PATENT DOCUMENTS
EP         1717553       11/2006

* cited by examiner

*Primary Examiner* — Timothy A Brainard
(74) *Attorney, Agent, or Firm* — Novak Druce + Quigg LLP

(57) ABSTRACT

A process and a device for automatically determining meteorological conditions in the vicinity of an aircraft is disclosed. The device (1) comprises a meteorological radar (2), able to determine the meteorological information associated with a primary geographical area ahead of an aircraft, and means (3, 4A, 4B) for automatically determining the meteorological conditions associated with a geographical area being extended with respect to the primary geographical area.

8 Claims, 2 Drawing Sheets

PROCESS AND A DEVICE FOR AUTOMATICALLY DETERMINING METEOROLOGICAL CONDITIONS IN THE VICINITY OF AN AIRCRAFT

CROSS-REFERENCE TO RELATED APPLICATIONS

This application claims priority to French Patent Application 0903263, filed Jul. 3, 2009, the entire contents of which are incorporated herein by reference.

FIELD OF THE INVENTION

The present invention relates to a process and a device for determining meteorological conditions in the vicinity of an aircraft, as well as of an aircraft provided with such a device.

BACKGROUND OF THE INVENTION

It is known that modern airplanes, including transport airplanes, are provided with meteorological radars being able to determine the meteorological conditions (storms, turbulence areas, rains, wind shears, etc.) of a geographical area, generally located in the front part of airplanes.

When the meteorological conditions being determined are bad, the pilots can adapt the flight trajectory and/or parameters of airplanes so as to limit the impacts thereof on the comfort and the safety of the passengers and the crew.

It is further known that, in order to obtain such meteorological conditions, meteorological radars emit electromagnetic waves in a given direction and analyze return waves sent back by targets (droplets, hails, etc.).

However, softening electromagnetic waves, more specifically by the air and clouds, as well as reflecting the latter on obstacles (for instance, mountains) reduce the detection distance of the radar and thus, the dimensions of the geographical area for which the meteorological conditions are obtained.

SUMMARY OF THE INVENTION

The aim of the present invention is to overcome such a drawback. It relates to a process for automatically determining meteorological conditions in the vicinity of a reference aircraft provided with at least one meteorological radar.

To this end, according to this invention, the process for automatically determining meteorological conditions in the vicinity of a reference aircraft provided with at least one meteorological radar,
said process wherein:
  through said meteorological radar, primary meteorological information are determined, being associated with a primary geographical area ahead of said reference aircraft; and
  through reception means on board said reference aircraft, auxiliary meteorological information is received, being associated with at least one auxiliary geographical area and coming from means being external to said reference aircraft,
is remarkable in that it comprises the following steps consisting in
  defining with respect to said reference aircraft, at least one space meshing comprising a plurality of points, each one of said points being representative of a geographical position and each one of said primary and auxiliary areas being defined, at least partially, by a set of points of said meshing;
  associating with each one of the points of said meshing at least one of said primary and/or auxiliary meteorological information;
  determining from said primary and auxiliary areas, an extended geographical area with respect to said primary area, said extended area being defined, at least partially, by a set of points of said meshing; and
  determining from said primary and auxiliary meteorological information, the meteorological conditions associated with said extended area.

Thus, thanks to this invention, the extended geographical area, for which the meteorological conditions are obtained, is wider than the primary area ahead of the reference aircraft. Consequently, the pilots thereof have a better knowledge of the surrounding meteorological conditions, so that they are able to adapt the trajectory of the aircraft so as to avoid hazardous areas which could compromise the safety of the passengers and the crew.

The expression <<meteorological information>> means information regarding, for instance:
  a meteorological phenomenon (phenomenon type (wind shear, turbulence, cloud, storm, etc.), latitude, longitude, intensity, etc.);
  the intensity of a signal received by said meteorological radar;
  said external means E (operating condition, type of means, etc.).

It should be appreciated that the above mentioned steps of the process according to this invention could be implemented in an iterative way.

Advantageously, said extended geographical area corresponds to the junction between said primary area and said auxiliary area.

Advantageously, said meshing is a three-dimension regular meshing. The latter can, for instance, take the form of a right-angled parallelepiped.

Preferably, each one of said primary, auxiliary and extended geographical areas is defined, at least partially, by a set of points of said meshing.

Furthermore, the geographical position of each of the points of said meshing could be defined by an altitude, a latitude and a longitude.

In addition, said external means could be:
  either arranged in another aircraft located in the vicinity of said reference aircraft;
  or arranged in a ground meteorological station.

Thus, the reference aircraft can benefit from the meteorological information obtained by neighbouring aircrafts and/or by ground meteorological stations.

According to an advantageous characteristic, said reception means are compatible with the ADS-B technology (for <<Automatic Dependant Surveillance-Broadcast>>).

Advantageously, on display means embedded on board said reference aircraft, at least one part of said meteorological conditions of said extended area can be displayed.

The present invention further relates to a device for automatically determining meteorological conditions in the vicinity of a reference aircraft provided with at least one meteorological radar. According to this invention, said device comprises:
  said meteorological radar able to determine the primary meteorological information associated with a primary geographical area ahead of said reference aircraft;
  means for receiving auxiliary meteorological information being associated with at least one auxiliary geographical area and coming from means external to said reference aircraft, means for defining, with respect to said reference aircraft, at least one space meshing comprising a plurality of points, each one of said points being representative of a geographical position and each one of said primary and auxiliary areas being defined, at least partially, by a set of points of said meshing;

means for associating with each one of the points of said meshing, at least one of said primary and/or auxiliary meteorological information;

means for determining, from said primary and auxiliary areas, an extended geographical area with respect to said primary area, said extended area being defined, at least partially, by a set of points of said meshing; and means for determining, from said primary and auxiliary meteorological information, the meteorological conditions associated with said extended area.

The present invention further relates to a system for exchanging meteorological information comprising:

devices for automatically determining meteorological conditions, such as described herein above and arranged respectively on board aircrafts; and means for emitting meteorological information to said devices and ground meteorological stations, so that said aircrafts and said ground meteorological stations can mutually exchange such meteorological information.

Furthermore, the present invention further relates to an aircraft comprising a device such as previously described.

BRIEF DESCRIPTION OF THE DRAWINGS

The figures of the appended drawing will better explain how this invention can be implemented. In these figures like reference numerals relate to like components.

DETAILED DESCRIPTION

Figure 1:
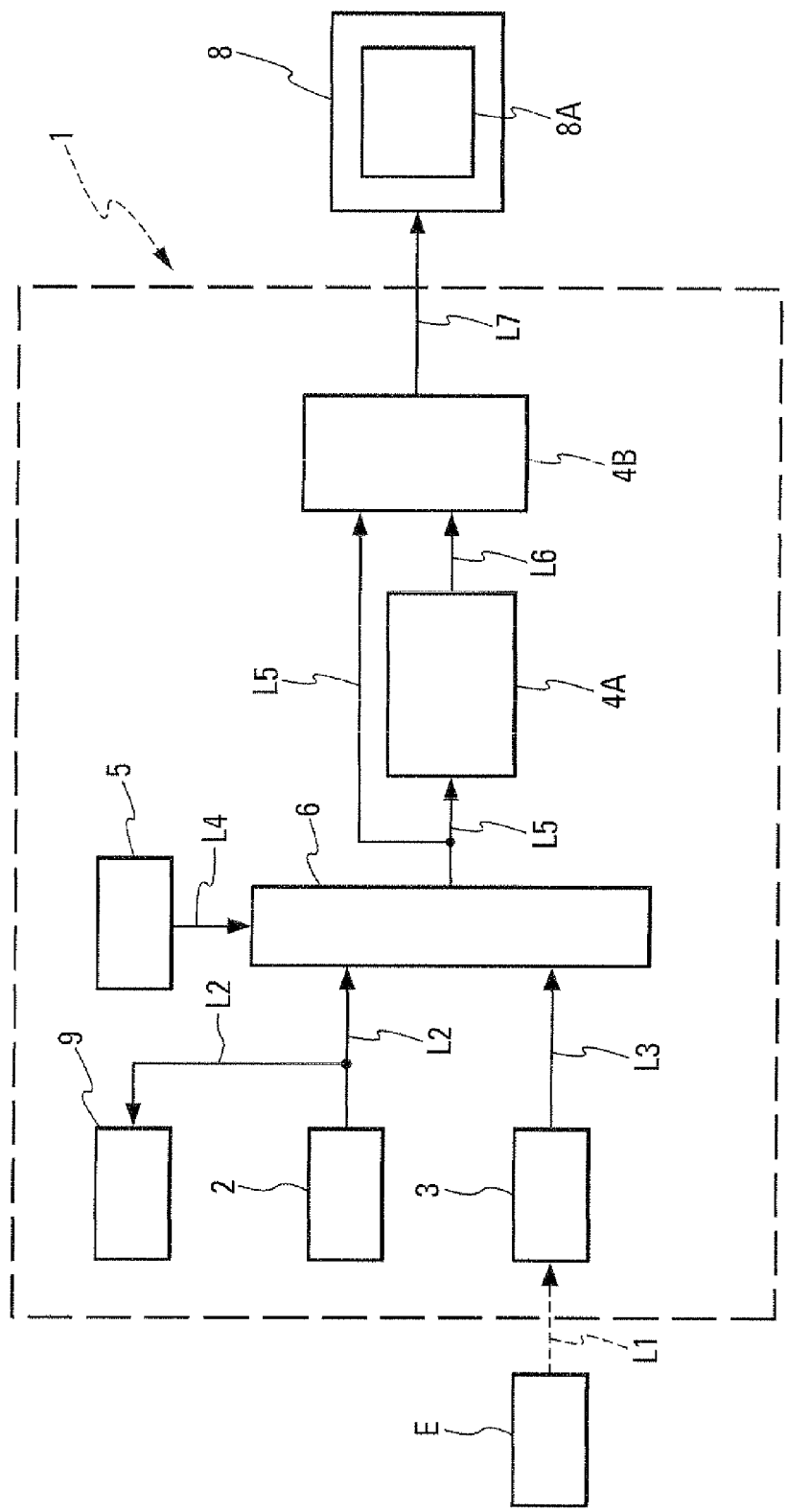
FIG. 1 represents a block diagram of a device according to the present invention on board a reference aircraft.

The device 1 according to this invention and schematically shown on FIG. 1, is to be used for automatically determining meteorological conditions in the vicinity of a reference aircraft ACr (see FIGS. 2 and 3), in particular a transport airplane, provided with at least one meteorological radar 2.

According to this invention, in order to determine the meteorological conditions in the vicinity of the aircraft ACr, the device 1, embedded on board the latter, comprises:

the meteorological radar 2 able to determine primary meteorological information associated with a primary geographical area Zp, ahead of the aircraft ACr, for instance under the form of an angular portion (FIGS. 2 and 3), means 3 for receiving, via a link L1, auxiliary meteorological information being associated with at least one part of an auxiliary geographical area Za (FIGS. 2 and 3) and coming from means E being external to the aircraft ACr. Obviously, the reception means 3 could also receive auxiliary meteorological information respectively associated with several auxiliary areas Za and transmitted by several distinct external means E;

means 4A for determining, from the primary Zp and auxiliary Za areas, a geographical area Ze being extended with respect to the primary area Zp. The extended area Ze corresponds to the junction between the primary area Zp and the auxiliary area Za; and means 4B for determining, from said primary and auxiliary meteorological information, the meteorological conditions associated with the thus determined extended area Ze.

The expression <<meteorological information>> means information regarding, for instance:

a meteorological phenomenon [phenomenon type (wind shear, turbulence, cloud, storm, etc.), latitude, longitude, intensity, etc.];

the intensity of a signal received by said meteorological radar 2;

said external means E (operating condition, type of means, etc.).

Figure 2:
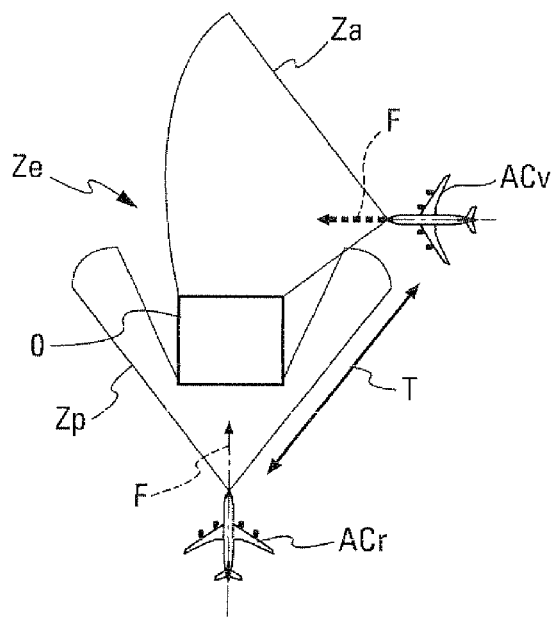
FIGS. 2 and 3 respectively show a first and a second example of an extended geographical area, obtained by the device on FIG. 1.
Figure 3:
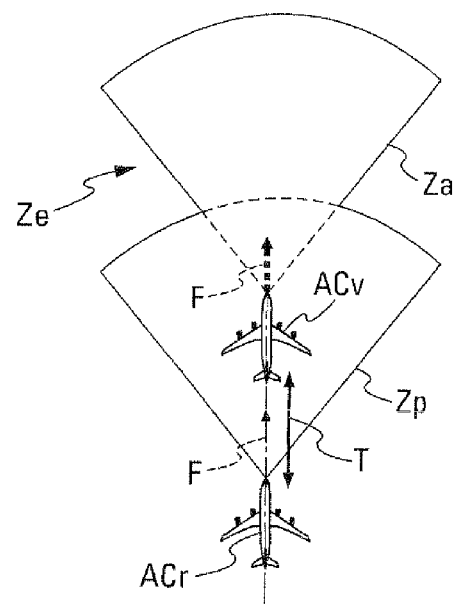

Within the context of the present invention, the external means E are present, for instance, under the form of a meteorological radar that could be:

either arranged in an aircraft ACv located in the vicinity of the aircraft ACr (see FIGS. 2 and 3);

or arranged in a ground meteorological station (not shown on the figures).

Thus, the reception means 3 can receive meteorological information coming from one or more neighbouring aircrafts ACv and/or from one or more ground meteorological stations.

Thereby, by means of this invention, the determined extended geographical area Ze is wider than the primary area Zp ahead of the aircraft ACr. The pilots thereof have then a better knowledge of the meteorological conditions they will be faced to, even in the case of obstacles (for example, a mountain), as shown in the example of FIG. 2 to be subsequently described. They can then modify the trajectory of the aircraft ACr, so as to possibly by-pass areas with poor meteorological conditions, or even still adapt the flight configuration of the aircraft ACr.

According to the invention, the device 1 further comprises:

means 5 for defining, with respect to the aircraft ACr, at least one space meshing M, comprising a plurality of points P, each of the points P being representative of a geographical position (for example defined by an altitude, a latitude and a longitude); and means 6 for associating with each one of the points P of the meshing M, at least one of the primary and auxiliary meteorological information. With a view to this, the means 6 are connected to the radar 2, the reception means 3 and the definition means 5, via respectively the links L2, L3 and L4. The means 6 are able to transmit to the means 4A and 4B, via a link L5, the meteorological information associated with each one of the points P of the meshing M.

Figure 4:
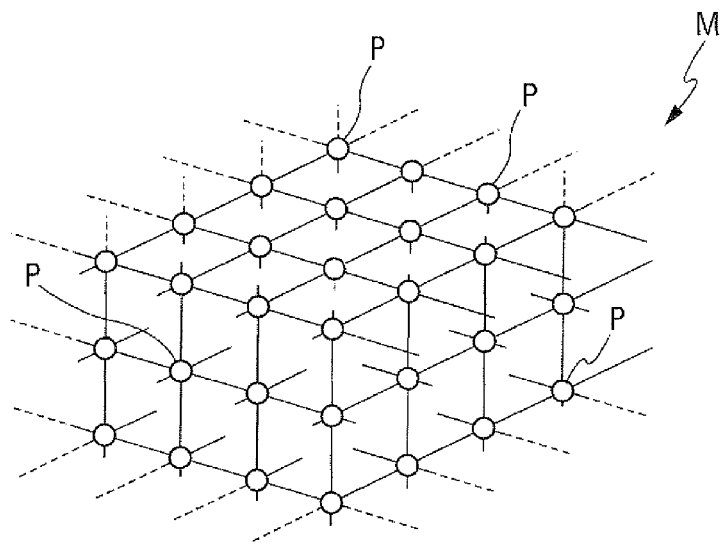
FIG. 4 shows, in a perspective view, a three-dimension regular space meshing, according to the present invention.

According to an exemplary embodiment of the present invention represented on FIG. 4, the meshing M is a three-dimension regular meshing, having the form of a right-angled parallelepiped.

A <<regular meshing>> means a meshing having the elementary meshes identical one with respect to the other. Naturally, it is obvious that any other type of existing meshing could also be contemplated.

It should be appreciated that the meshing M could be normalized so as to make easier the exchange of data between the aircraft ACr, aircrafts ACv and ground meteorological stations.

Each one of the primary Zp, auxiliary Za and extended Ze geographical areas is defined, at least partially, by a set of points P of the meshing M.

From the primary and/or auxiliary meteorological information, as well as from the characteristics of the determined extended area obtained from means 4A, via the link L6, the means 4B usually determine the meteorological conditions relative to the extended geographical area Ze.

At least one part of the thus determined meteorological condition can be displayed on a viewing screen 8A belonging to display means 8. The latter, connected to the means 4B via a link L7, are embedded in the cockpit of the aircraft ACr.

Furthermore, the device 1 could further comprise means 9 for emitting, to outside the aircraft ACr, at least one part of the primary meteorological information determined by the meteorological radar 2. Such means 9 are connected to the radar 2 via the link L2.

It should be appreciated that the emission means 9 could also be able to emit at least one part of the auxiliary meteorological information received by the reception means 3.

Furthermore, the reception means 3 and the emission means 9 can be compatible with the ADS-B technology. It could be contemplated that the means 3 and 9 belong to a communication system embedded on board the aircraft ACr.

As illustrated by the arrow T of the FIGS. 2 and 3, in the case of an aircraft ACv provided with ADS-B type communication means, the aircraft ACr and the aircraft ACv can communicate and mutually exchange meteorological information. Obviously, this also applies to a ground meteorological station provided with ADS-B type communication means.

A system could also be contemplated for exchanging meteorological information between the aircrafts ACr, ACv and the ground meteorological stations. Such a system can comprise:

devices 1 for automatically determining meteorological conditions, such as that previously described, being embedded respectively on board the aircrafts ACr, ACv; and means for emitting meteorological information towards the devices 1 and the ground meteorological stations. Such emission means can be embedded on board the aircrafts ACr, ACv and/or arranged in the ground meteorological stations.

In such a system, the meteorological information, determined by the aircrafts ACv, ACr, could be relayed by the ground meteorological stations (then acting as transmission relays).

Moreover, exchanging information between the aircraft ACr and a neighbouring aircraft ACv (or a ground meteorological station) could occur using predefined format messages.

Such messages can comprise:

a sending header, comprising, for instance, information relating to the radar condition, the selected mode, the type of meshing M, etc.; and one or more data fields. Each field is associated with a point P of the meshing M and comprises, for instance, information relating to the intensity of a signal being received by the meteorological radar (of the aircraft ACr, an aircraft ACv or a ground meteorological station), the latitude and longitude of the point P being considered, the type of detection, the date of detection, etc.

Furthermore, on FIGS. 2 and 3, two examples are represented of an extended area Ze obtained by the device 1 according to this invention.

In the example of FIG. 2, although the primary area Zp of the meteorological radar 2 of the aircraft ACr is reduced due to the presence of an obstacle O (for instance a mountain), the pilots of the aircraft ACr have access to the meteorological conditions of the extended area Ze formed by joining the primary area Zp and an auxiliary area associated with the meteorological radar of a neighbouring aircraft ACv, located behind the obstacle O.

Similarly, in the example of FIG. 3, the extended area Ze is formed by joining the primary area Zp and an auxiliary area associated with the meteorological radar of a neighbouring aircraft ACv, located ahead of the aircraft ACr. The determined meteorological conditions available to the pilots of the aircraft ACr are much denser than those supplied by its single meteorological radar 2.

The invention claimed is:

1. A process for automatically determining meteorological conditions in the vicinity of a reference aircraft (ACr) provided with at least one meteorological radar (2), said process comprising the steps of:

determining through said meteorological radar (2), primary meteorological information associated with a primary geographical area (Zp) ahead of said reference aircraft (ACr);

receiving through reception means (3) on board said reference aircraft (ACr), auxiliary meteorological information associated with at least one auxiliary geographical area (Za) and coming from means (E) being external to said reference aircraft (ACr);

defining with respect to said reference aircraft (ACr), at least one space meshing (M), comprising a plurality of points (P), each one of said points (P) being representative of a geographical position and each one of said primary area (Zp) and auxiliary area (Za) being defined, at least partially, by a set of points (P) of said meshing (M);

associating with each one of the points (P) of said meshing, a data related to at least one of said primary and/or auxiliary meteorological information, wherein said data comprises a type, an intensity, and a date of detection of said meteorological information;

determining from said primary area (Zp) and auxiliary area (Za), a geographical area (Ze) being extended with respect to said primary area (Zp), said extended area (Ze) being defined, at least partially, by a set of points (P) of said meshing (M); and determining from said primary and auxiliary meteorological information, the meteorological conditions associated with said extended area (Ze), wherein said meshing (M) is a three-dimension regular meshing, wherein said meshing (M) is normalized to facilitate data exchange.

2. The process according to claim 1, wherein said extended area (Ze) corresponds to the junction of said primary area (Zp) and said auxiliary area (Za).

3. The process according to claim 1, wherein each one of said primary area (Zp), auxiliary area (Za) and extended area (Ze) is defined, at least partially, by a set of points (P) of said meshing (M).

4. The process according to claim 1, wherein said external means (E) are arranged in another aircraft (ACv) located in a vicinity of said reference aircraft (ACr).

5. The process according to claim 1, wherein said external means (E) are arranged in a ground meteorological station.

6. A device for automatically determining meteorological conditions in the vicinity of a reference aircraft (ACr) provided with at least one meteorological radar (2), wherein:

said meteorological radar (2) is able to determine the primary meteorological information associated with a primary geographical area (Zp) ahead of said reference aircraft;

means (3) are provided for receiving auxiliary meteorological information being associated with at least one auxiliary geographical area (Za) and coming from means external to said reference aircraft (ACr), means (5) are provided to define with respect to said reference aircraft (ACr), at least one space meshing (M) comprising a plurality of points (P), each one of said points (P) being representative of a geographical position and each one of said primary area (Zp) and auxiliary area (Za) being defined, at least partially, by a set of points (P) of said meshing (M);

means (6) are provided for associating with each one of the points (P) of the meshing (M) a data related to at least one of said primary and/or auxiliary meteorological information, wherein said data comprises a type, an intensity, and a date of detection of said meteorological information;

means (4A) are provided for determining, from said primary area (Zp) and auxiliary area (Za), a geographical area (Ze) being extended with respect to said primary area (Zp), said extended area (Ze) being defined, at least partially, by a set of points (P) of said meshing (M); and means (4B) are provided for determining, from said primary and auxiliary meteorological information, the meteorological conditions associated with said extended area (Ze), wherein said meshing (M) is a three-dimension regular meshing, wherein said meshing (M) is normalized to facilitate data exchange.

7. A system for exchanging meteorological information, comprising:

devices (1) for automatically determining meteorological conditions, as specified according to claim 6, being arranged respectively on board the aircrafts (ACr, ACv); and means for emitting meteorological information to said devices (1) and ground meteorological stations, so that said aircrafts (ACr, ACv) and said ground meteorological stations can mutually exchange such meteorological information.

8. An aircraft, comprising a device as specified according to claim 6.

* * * * *

UNITED STATES PATENT AND TRADEMARK OFFICE
CERTIFICATE OF CORRECTION

| | | |
|---|---|---|
| PATENT NO. | : 8,350,748 B2 | Page 1 of 1 |
| APPLICATION NO. | : 12/828426 | |
| DATED | : January 8, 2013 | |
| INVENTOR(S) | : Guillaume Fouet, Xavier Grossin and Sebastien Robert | |

It is certified that error appears in the above-identified patent and that said Letters Patent is hereby corrected as shown below:

On Page 1, Column 1, under (21) Appl. No.:, the last numerical digit is missing, should read --12/828,426--

Signed and Sealed this

Nineteenth Day of March, 2013

Teresa Stanek Rea
*Acting Director of the United States Patent and Trademark Office*